United States Patent [19]
Hellman

[11] Patent Number: 5,292,167
[45] Date of Patent: Mar. 8, 1994

[54] COVER FOR WINDSHIELDS

[75] Inventor: Lloyd S. Hellman, Leawood, Kans.

[73] Assignee: Sleet Sheet Company, Kansas City, Mo.

[21] Appl. No.: 930,378

[22] Filed: Aug. 14, 1992

[51] Int. Cl.5 .............................................. B60J 3/00
[52] U.S. Cl. ................................. 296/95.1; 150/168; 160/370.2 R; 296/136
[58] Field of Search ................... 296/95.1, 136, 97.7; 150/166, 168; 160/370.2

[56] References Cited

U.S. PATENT DOCUMENTS

| | | | |
|---|---|---|---|
| 2,223,145 | 11/1940 | Wise | 296/95.1 X |
| 4,726,406 | 2/1988 | Weatherspoon | 296/95.1 X |
| 4,948,192 | 8/1990 | Sohne | 296/95.1 |
| 5,035,460 | 7/1991 | Huang | 296/95.1 |

FOREIGN PATENT DOCUMENTS 4023489 1/1992 Fed. Rep. of Germany ..... 296/95.1

Primary Examiner—Joseph D. Pape
Attorney, Agent, or Firm—Litman, McMahon & Brown

[57] ABSTRACT

A cover for windshields is provided which includes a panel assembly having first and second longitudinal edges and first and second side edges. First and second flaps are formed adjacent to the panel assembly first and second side edges respectively. A pair of strut members are secured to the panel assembly in proximity to the panel assembly side edges and function to impart some rigidity to the panel assembly at its side edges. A pair of tensile members are provided for mounting the panel assembly and each includes first and second ends which are anchored to a respective flap. The tensile members are elastic and can be stretched over parts of the vehicle, such as the outside rear view mirrors, for mounting the windshield cover.

22 Claims, 1 Drawing Sheet

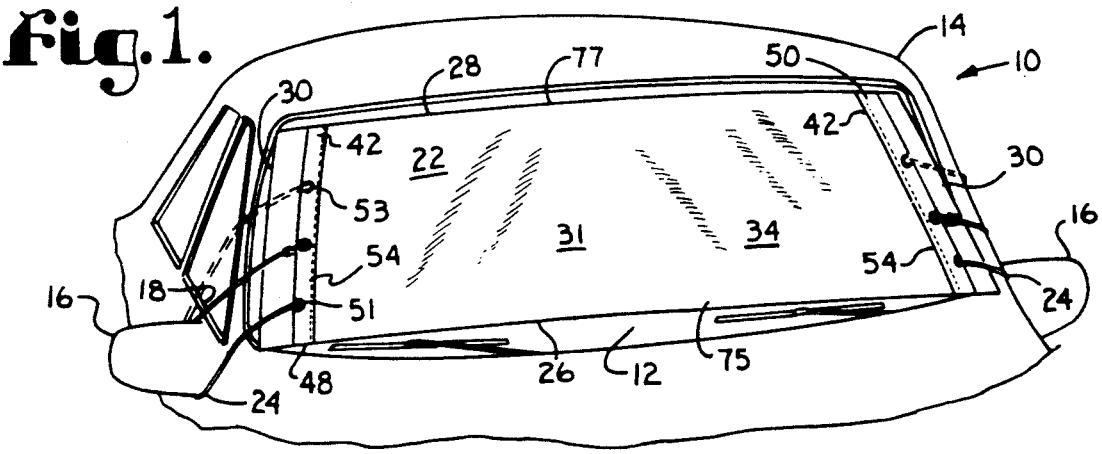
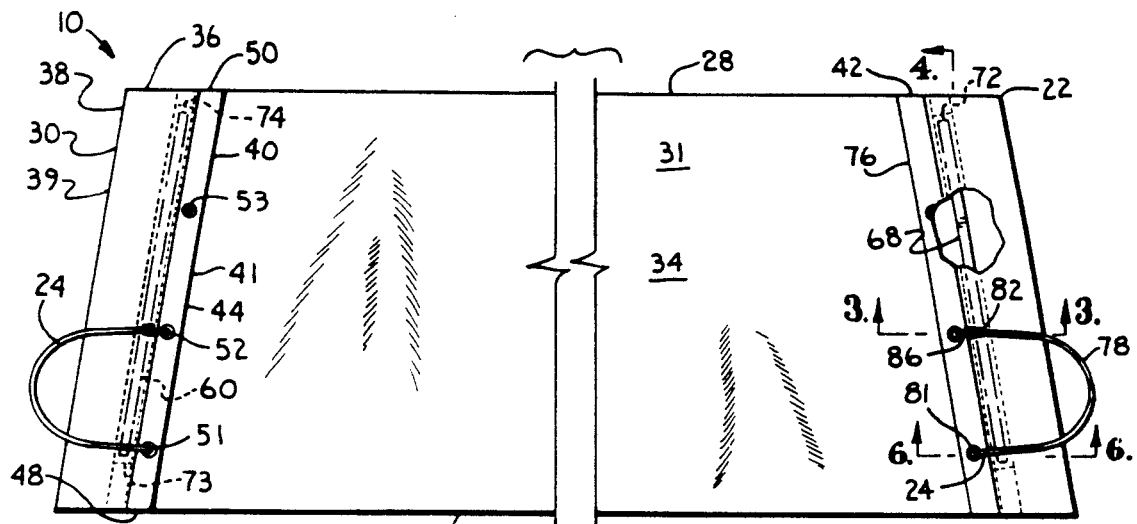
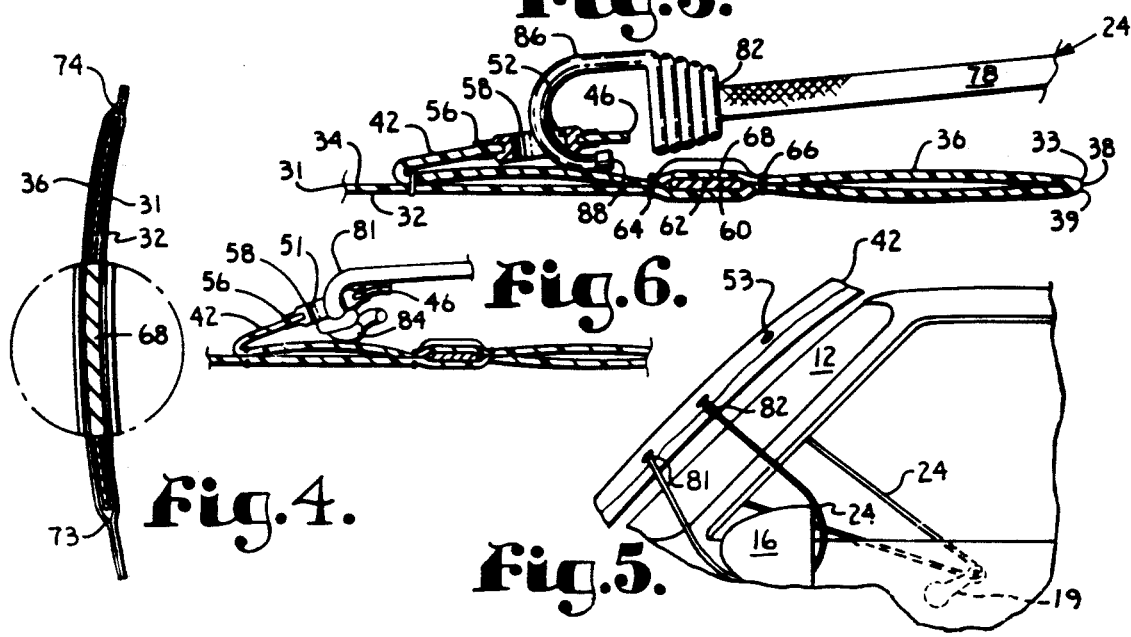

COVER FOR WINDSHIELDS

BACKGROUND OF THE INVENTION

1. Field of the Invention

The present invention relates generally to covers for protecting objects from the elements, and in particular to a cover for vehicle windshields and the like.

2. Description of the Related Art

Various covers have heretofore been proposed for shielding and protecting covered articles from the elements. Such covers and covering systems are generally designed to accommodate the configuration of the articles being covered and to provide protection from various ambient environmental conditions, such as precipitation in the form of rain, sleet, snow, etc, or solar insolation.

As an example of a relatively common problem which can be addressed by the use of an appropriate cover, vehicle windshields can acquire accumulations of snow and ice if left unprotected in inclement weather. Removing such accumulations can be relatively tedious and require the use of hand scrapers and the like. Moreover, the vehicle windshield clearing procedures must often be carried out in inclement weather, subjecting the vehicle operators to ambient temperatures which are often below freezing and exposure to additional snowfall, freezing rain, sleet, etc. Scraping vehicle windshields has thus been a generally unpleasant task which often must be carried out in conditions which are less than optimum.

To avoid the accumulation of precipitation thereon, various covers have previously been proposed for vehicle windshields. For example, the Moszelt U.S. Pat. No. 2,614,630 discloses a windshield cover with side hooks for engaging a door frame.

The Sohne U.S. Pat. No. 4,948,192 discloses a windshield cover apparatus with straps which extend into the door openings for engagement with various vehicle interior components, such as the steering wheel and the sun visors. Installation procedures which require closing the vehicle doors on various straps, hooks and the like can be objectionable due to possible risks of vehicle damage and the necessity of opening and closing the vehicle doors, possibility in inclement weather. Such insulation procedures can also be objectionable because a person installing such a cover may be required to extend his or her hands through the door opening, and thus be subjected to the possible risk of injury from an inadvertent closure of a vehicle door.

Some previous windshield covers, such as those shown in U.S Pat. Nos. 2,614,630 and 4,948,192, required anchoring in proximity to all four corners of their generally rectangular configurations. However, anchoring tensile members in the general vicinity of the upper and lower portions of a vehicle windshield generally required attachment to some portion of the vehicle (e.g., Moszelt U.S. Pat. No. 2,614,630), or extension of the tensile members through the vehicle door openings for attachment to structure in the vehicle interior (e.g., Sohne U.S. Pat. No. 4,948,192).

The number of cover anchors can be reduced to two per cover by placing a pair of rigid members along the cover side edges and anchoring the rigid members medially to the vehicle. For example, the Lunt U.S. Pat. No. 3,588,169; the Duffy U.S. Pat. No. 4,597,608; and the Weatherspoon U.S. Pat. No. 4,726,406 all show such arrangements. However, these devices rely on hooks for engaging the windshield molding or straps for capturing in the vehicle door openings.

Heretofore, there has not been available a windshield cover with a system for anchoring it to the outside rear view mirrors with the advantages and features of the present invention. The present invention addresses some or all of the shortcomings of the previous windshield covers described above.

SUMMARY OF THE INVENTION

In the practice of the present invention, a windshield cover is provided which includes a panel assembly with first and second longitudinal edges and first and second side edges. The panel assembly is triple folded adjacent to its side edges to form first and second intermediate layers and first and second flaps. Strut member passages are formed between the intermediate layers and a panel assembly inner layer and receive a pair of strut members, each of which extends generally parallel to a respective panel assembly side edge. The strut members are bowed with outwardly-convex configurations for conforming to the contours of a vehicle windshield. A pair of tensile members have opposite ends which are anchored to lower portions of the flaps in spaced relation whereby lower portions of the strut members are relatively securely retained by the tensile members and upper portions of the strut members cantilever upwardly therefrom. The tensile members can be elastomeric for stretching over the vehicle outside rear view mirrors for mounting the windshield cover. The triple-folded configuration of the panel assembly at the side edges thereof functions to protect the vehicle from being scratched by the tensile member ends.

OBJECTS AND ADVANTAGES OF THE INVENTION

The principle objects and advantages of the present invention include: providing a cover for windshields and the like; providing such a cover which can be mounted on a vehicle by attaching it to outside rear view mirrors thereof; providing such a cover which can be mounted on a vehicle without opening the doors thereof; providing such a cover which can be installed and removed without reaching through a door opening; providing such a cover which reduces or minimizes concern for hand injuries to persons installing and removing same; providing such a cover which can quickly and easily be installed; providing such a cover which is adapted for relatively complete coverage of a vehicle windshield; providing such a cover which can be relatively securely retained against upper portions of a windshield by anchoring lower portions of the cover; providing such a cover which is adaptable to a relatively wide variety of vehicles; providing such a cover which can be produced in relatively few sizes for fitting a relatively large number of vehicles; providing such a cover which can be installed relatively easily without altering or damaging the vehicle; providing such a cover which is economical to manufacture, efficient in operation, capable of a long operating life and particularly well adapted for the proposed uses and applications thereof.

Other objects and advantages of this invention will become apparent from the following description taken in conjunction with the accompanying drawings wherein are set forth, by way of illustration and example, certain embodiments of this invention.

3

The drawings constitute a part of this specification and include exemplary embodiments of the present invention and illustrate various objects and features thereof.

BRIEF DESCRIPTION OF THE DRAWINGS

FIG. 1 is a front, right side perspective view of a cover embodying the present invention, shown mounted on an automobile in a covering relation over a windshield thereof.

FIG. 2 is an enlarged, front or outer elevational view of the windshield cover.

FIG. 3 is an enlarged, fragmentary, cross-sectional view of the windshield cover, taken generally along line 3—3 in FIG. 2.

FIG. 4 is a generally vertical, cross-sectional view of the cover taken generally along line 4—4 in FIG. 2, with a portion thereof enlarged.

FIG. 5 is a side elevational view of the cover showing the mounting thereof on a vehicle.

FIG. 6 is an enlarged, fragmentary, cross-sectional view of the windshield cover, taken generally along line 6—6 in FIG. 2.

DETAILED DESCRIPTION OF THE PREFERRED EMBODIMENTS

Introduction and Environment

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

The reference numeral 10 generally designates a cover embodying the present invention. Without limitation on the generality of useful applications of the cover 10, it is shown mounted on the windshield 12 of an automobile 14 including outside rear view mirrors 16. Each outside rear view mirror 16 is mounted on a respective door 18 in spaced relation rearwardly from the windshield 12.

The windshield cover 10 generally comprises a panel assembly 22 and a pair of tensile members 24. Each door 18 also includes a window crank handle 19 on the inside thereof.

Panel Assembly 22

The panel assembly 22 has the general configuration of a trapezoid with parallel first (lower) and second (upper) longitudinal edges 26, 28 and opposite side edges 30 which converge from the first longitudinal edge 26 toward the second longitudinal edge 28. Substantially the entire area of the panel assembly 22 is covered by an inner layer 31 with inner and outer surfaces 32, 34 and a pair of margins 33 each located at a respective panel assembly side edge 30.

A pair of panel assembly intermediate layers 36 are folded inwardly from respective panel assembly side edges 30. Each intermediate layer 36 includes an outer edge 38 connected to a respective panel assembly side edge 30 at a respective outer fold line 39 and an inner intermediate layer edge 40. The intermediate layers 36 overlie the inner layer outer surface.

A pair of flaps 42 each includes an inner, fixed edge 44 integrally connected to a respective intermediate layer inner edge at an inner fold line 41 and an outer, free edge 46. Each flap 42 overlies a respective intermediate layer 36 and includes first (lower) and second (upper) ends located in proximity to the panel assembly first and second longitudinal edges 26, 28 respectively. Each flap outer edge 46 is generally located between respective intermediate layer inner and outer edges 40, 38. Each flap 42 includes a first receiver 51 located in proximity to its first end 48 and a second receiver 52 located between the flap first end 48 and a point midway between the flap ends 48, 50 whereby both receivers 51, 52 are located in a first (i.e., lower) half 54 of a respective flap. A pair of third receivers 53 are each located in a respective flap approximately midway between a respective second receiver 52 and a respective flap second (upper end 50). Annular receiver reinforcing means 56 surround each receiver 51, 52, 53 and can comprise a thickened portion of the flap material or, alternatively, a metal grommet ring 58 crimped in place.

The inner layer 31, the intermediate layers 36 and the flaps 42 preferably comprise a unitary panel of flexible sheet material, such as ten mil (0.010 inches) polyethylene folded at the inner and outer fold lines 41, 39.

A pair of strut means 60 are incorporated in the panel assembly in proximity to the side edges thereof. Each strut means 60 includes a respective strut channel 62 formed by respective inner and outer strut channel seams 64, 66 interconnecting the panel assembly inner and intermediate layers 31, 36. Each strut channel 62 receives an elongated bow or strut member 68 with first (lower) and second (upper) ends 71, 72 and a curvature or bow which is outwardly-convex. Each channel can include first (lower) and second (upper) end seams 73, 74 for closing the ends thereof and sealing the strut members 68 therein.

Since the strut members 68 terminate at first and second ends located in spaced relation inwardly from the panel assembly first and second longitudinal edges 26, 28 respectively, first (lower) and second (upper) longitudinal margin portions 75, 77 are formed adjacent to the first and second panel assembly longitudinal edges 26, 28 respectively and comprise parts of the panel assembly 22.

The strut members 68 can comprise any suitable resilient, spring-like material, such as metal, rigid plastic, wood, etc.

A pair of seam lines 76 are formed whereat the inner layer 31, the intermediate layer 36 and the flaps 42 are fixedly joined together along the inner fold lines 41, for example, by ultrasonic welding, adhesive or stitching.

The panel assembly material can be translucent to avoid being overly prominent in appearance when installed on a vehicle to thereby reduce the chances of the cover 10 being noticed and stolen. The panel assembly material can also be opaque, and is preferably impervious to moisture.

Tensile Members

Each tensile member 24 can comprise, for example, an elongated, elastic cord 78 with appropriate characteristics of strength and elasticity. Each cord 78 includes a first end 81 with knot means 84 for engaging the grommet ring 58 at the first receiver 51 for providing anchoring means for anchoring the tensile member first end 81 on the flap 42 and a hook 86 fixedly mounted on a tensile member second end 82 for providing second anchoring means for releasably anchoring the tensile member second end 82 in either receiver 52, 53 on the flap 42.

Each hook 86 is capped by an end cap 88, which can comprise an elastomeric material to avoid scratching the vehicle by contact with an exposed hook end.)

The tensile members 24 can be any suitable length, and can be length-adjustable.

Operation

In operation, the cover 10 can be sized and configured to accommodate a variety of vehicle windshields. Therefore, a relatively small number of panel assembly sizes and configurations can accommodate a relatively large number of vehicles. For example, a small cover 10 and a large cover 10 could be sized and configured to accommodate most automobile windshields. It will be appreciated that various other sizes and configurations of panel assemblies 22 could be provided for "special" or "custom" applications.

The cover 10 is designed for installation on vehicles 14 with outside rear view mirrors 16 on both sides whereby the entire installation and removal procedures can be accomplished without opening the vehicle doors 18 and without having to extend any straps, cords, etc. through the vehicle door or window openings. Installation can be accomplished by placing the cover panel assembly 22 on the windshield 12 in a substantially centered position thereon and looping the tensile members 24 over the outside rear view mirrors 16. Since the tensile members 24 are elastic, they can generally be placed over the mirrors 16 without disengaging their ends 81, 82. Alternatively, the tensile member ends 81, 82 can be released from the flaps 42, e.g., by removing the hooks 86 from respective receivers 52 or 53. The tension in the tensile members 24 can be adjusted by repositioning the knots 84 at the ends 82 thereof.

Alternatively, the tensile members 24 can be extended into the vehicle interior and looped over the window crank handles 19 or other structure, or simply captured within the vehicle doors in their closed positions.

The strut members 68 function to retain the panel assembly 22 in place against the windshield 12.

The strut members 68 function as flexible, structural members or beams, the lower halves of which are anchored by the tensile members 24 and the upper portions of which project or extend therefrom and structurally function as cantilevered portions of the strut members 68, the lower portions of which are fixed in position by the tensile members 24 which attach at the flap receivers 51, 53. The pre-bent, outwardly-convex configurations of the strut members 68 function to conform to the outwardly-convex curvature of most vehicle windshields whereby the panel assembly 22 can be retained relatively firmly against the windshield 12 adjacent to the panel assembly side edges 30. Preferably the panel assembly side edges 30 and longitudinal edges 26, 28 engage the vehicle 14 substantially continuously to relatively completely seal the cover 10 against the windshield 12 and also to minimize the possibility of wind entering through one of the edges and getting behind the cover 10 to pull it off of the windshield 12. Furthermore, a relatively secure engagement along the panel assembly edges 26, 28, 30 minimizes infiltration by precipitation, e.g., blowing rain, sleet or snow. Still further, a relatively secure engagement by the panel assembly 22 tends to minimize wind displacement and flapping of the panel assembly 22, which could reduce its effective life.

The cooperation of the elastic tensile members 24 with the semi-rigid strut members 68 tends to place the entire panel assembly 22 in tension for relatively secure engagement on the windshield 12. The tension exerted by the tensile members 24 tends to flatten the strut members 68 and remove some of the prebent arch therefrom. The strut members 68 are thus pulled by the tensile members 24 downwardly and rearwardly into relatively close conformity to the configuration of the windshield 12 whereby the entire panel assembly 22 can be relatively securely mounted on the windshield 12.

The elasticity of the tensile members 24 facilitates mounting the windshield cover 10 on a variety of different vehicles 14. Generally it is not necessary for the panel assembly 22 to completely cover the windshield 12, so long as a sufficient area is covered to provide the driver with a relatively unobstructed view therethrough. The elasticity of the tensile members 24 permits placing them over rear view mirrors 16 and/or other vehicle structure in various locations. Alternatively, the lengths of the tensile members 24 can be readily adjusted by repositioning the knots 84 therein. Still further, length-adjustable tensile members 24 could be provided, or tensile members 24 of various lengths could be mounted on the panel assembly 22.

It is to be understood that while certain forms of the present invention have been illustrated and described herein, it is not to be limited to the specific forms or arrangement of parts described and shown.

What is claimed and desired to be secured by Letters Patent is as follows:

1. A cover for windshields, which comprises:
   (a) a panel assembly comprising a flexible material and having:
      (1) first and second longitudinal edges;
      (2) first and second side edges extending between said longitudinal edges;
      (3) first and second flaps each positioned inboard of a respective side edge; and
   (b) a pair of tensile members each having first and second ends;
   (c) a pair of first anchoring means each adapted for anchoring a respective tensile member first end to a respective flap;
   (d) a pair of second anchoring means each adapted for anchoring a respective tensile member second end to a respective flap, each said second anchoring means being connected to a respective flap in proximity to or below a point located generally midway between said panel assembly first and second longitudinal edges; and
   (e) a pair of strut means each fastened to said panel assembly in proximity to a respective side edge thereof and terminating in spaced relation above the point of connection of said second anchoring means.

2. The invention of claim 1 wherein:
(a) the panel assembly has the general configuration of a trapezoid with generally parallel first and second longitudinal edges and said side edges converging towards each other from said second longitudinal edge toward said first longitudinal edge.

3. The invention of claim 1 wherein:
(a) said panel assembly includes double layers of said flexible material adjacent each side edge thereof.

4. The invention of claim 3 wherein said panel assembly includes:
(a) an inner layer of said material extending between said side edges;
(b) a pair of intermediate layers each overlying a portion of said inner layer at said panel assembly double layers; and
(c) each said flap forming an outer layer overlying at least a portion of a respective intermediate layer.

5. The invention of claim 4, which includes:
(a) said inner layer having a pair of margins each located at a respective panel assembly side edge;
(b) each said intermediate layer having an outboard edge at a respective panel assembly side edge and an inner edge;
(c) each said flap having an inner edge and a free, outer edge;
(d) a pair of inner fold lines each joining a respective intermediate layer inner edge and a respective flap inner edge; and
(e) a pair of seam lines each located, at said inner fold line interconnecting said inner layer, said intermediate layer and said flap.

6. The invention of claim 5, which includes:
(a) each said strut means comprising an elongated strut member fastened to said panel assembly between a respective side edge and a respective inner fold line.

7. The invention of claim 6 wherein:
(a) said panel assembly includes inner and outer surfaces;
(b) said flaps overlie said panel assembly outer surface; and
(c) said strut members are outwardly-convex.

8. The invention of claim 7, which includes:
(a) a pair of channels each formed between a respective panel assembly inner layer and intermediate layer;
(b) each said channel extending generally parallelly between a respective panel assembly side edge and a respective seam.

9. The invention of claim 8, which includes:
(a) a pair of inner strut channel seams each securing a respective intermediate layer to said inner layer;
(b) a pair of outer strut channel seams each securing a respective intermediate layer to said inner layer; and
(c) each said strut channel being located between a respective outer strut channel seam and a respective inner strut channel seam.

10. The invention of claim 1, which includes:
(a) each said first and second anchoring means comprising respective first and second receivers in a respective flap and said tensile member second ends each having a hook fastened thereto and adapted for receipt in a respective flap receiver.

11. The invention of claim 10, which includes:
(a) each said flap receiver having grommet reinforcing means surrounding same.

12. The invention of claim 10, which includes:
(a) each said tensile member first end including knot means for retaining said tensile member first end in a respective flap receiver.

13. The invention of claim 6 wherein:
(a) each said strut member includes first and second ends each located in spaced relation from a respective first and second longitudinal edge.

14. The invention of claim 1 wherein:
(a) each said tensile member comprises an elastic cord.

15. The invention of claim 10 wherein:
(a) each said flap includes first and second ends;
(b) each said first flap receiver is located in proximity to a first end thereof; and
(c) each said flap second receiver is located below a point midway between said flap ends.

16. The invention of claim 10, which includes:
(a) a pair of third flap receivers each positioned between a respective second flap receiver and said panel assembly second longitudinal edge.

17. A cover for windshields, which includes:
(a) a panel assembly including:
(1) first and second longitudinal edges extending generally parallelly with respect to each other;
(2) a pair of opposite side edges;
(3) said panel assembly having the general configuration of a trapezoid with said side edges converging from said first longitudinal edge toward said second longitudinal edge;
(4) an inner layer extending between said longitudinal and side edges;
(5) a pair of intermediate layers each having an outer edge connected to said inner layer by an outer fold line at a respective panel assembly side edge and an inner edge;
(6) a pair of flaps each having a flap inner edge connected to a respective intermediate layer inner edge at a respective inner fold line and a free, outer edge;
(7) each said flap having first and second ends located in proximity to said first and second longitudinal edges respectively;
(8) each said flap having first, second and third receivers, said first receiver being located in proximity to said flap first end, said second receiver being located between said flap first end and a point midway between said flap ends, and said third receiver being located substantially midway between said flap second receiver and said second end;
(9) each said flap including first, second and third annular reinforcing means surrounding said first, second and third receivers respectively;
(10) a pair of strut member channels each formed between a respective intermediate layer and said inner layer;
(11) a pair of outer channel seams each located along a respective channel and interconnecting said inner layer and a respective intermediate layer;
(12) a pair of inner channel seams each located along a respective channel opposite a respective outer channel seam and interconnecting said inner layer and a respective intermediate layer;

(13) a pair of strut members each including first and second ends and an outwardly-bowed configuration, each said strut member being received in a respective strut member channel;
(14) each said strut member having first and second ends located in spaced relation inwardly from said first and second longitudinal edges respectively with said strut members received in said channels;
(15) said inner layer having inner and outer surfaces;
(16) a pair of lines each extending along a respective inner fold line said inner layer, said intermediate layer and said flap being joined together along a respective said line;
(17) a first panel longitudinal margin portion between said first longitudinal edge and said strut member first ends;
(18) a second panel longitudinal margin portion between said second longitudinal edge and said strut member second ends;
(19) said panel assembly generally comprising a flexible moisture, impervious material; and
(20) each said intermediate layer overlying said inner layer outer face and each said flap overlying a respective intermediate layer with said flap outer edge located between said intermediate layer edges; and
(b) a pair of tensile members each including:
(1) an elastic cord with first and second ends;
(2) a knot at said cord first end;
(3) said first end extending through a respective flap first receiver and being retained therein by engagement of said knot with said flap;
(4) a hook mounted on said second end and adapted for releasable engagement with one of said second and third receivers; and
(5) a resilient hook end cap mounted on said hook.
18. The invention of claim 17, which includes:
(a) said panel assembly material comprising polyethylene plastic with a thickness of approximately 0.01 inches.
19. The invention of claim 18, which includes:
(a) said panel assembly material being translucent.
20. The invention of claim 18, which includes:
(a) said panel assembly material being opaque.
21. A cover for windshields which comprises:
(a) a panel assembly comprising a flexible material and having:
(1) first and second longitudinal edges;
(2) first and second side edges extending between said longitudinal edges;
(3) first and second flaps each positioned inboard of a respective side edge; and
(b) a pair of tensile members each having first and second ends;
(c) a pair of first anchoring means each adapted for anchoring a respective tensile member first end to a respective flap;
(d) a pair of second anchoring means each adapted for anchoring a respective tensile member second end to a respective flap;
(e) a pair of strut means each fastened to said panel assembly in proximity to a respective side edge thereof;
(f) said inner layer having a pair of margins each located at a respective panel assembly side edge;
(g) each said intermediate layer having an outboard edge at a respective panel assembly side edge and an inner edge;
(h) each said flap having an inner edge and a free, outer edge;
(i) a pair of inner fold lines each joining a respective intermediate layer inner edge and a respective flap inner edge; and
(j) a pair of seam lines each located at said inner fold line interconnecting said inner layer, said intermediate layer and said flap.
22. A cover for windshields which comprises:
(a) a panel assembly comprising a flexible material and having:
(1) first and second longitudinal edges;
(2) first and second side edges extending between said longitudinal edges;
(3) first and second flaps each positioned inboard of a respective side edge; and
(b) a pair of tensile members each having first and second ends;
(c) a pair of first anchoring means each adapted for anchoring a respective tensile member first end to a respective flap;
(d) a pair of second anchoring means each adapted for anchoring a respective tensile member second end to a respective flap;
(e) a pair of strut means each fastened to said panel assembly in proximity to a respective side edge thereof; and
(f) each said first and second anchoring means comprising respective first and second receivers in a respective flap and said tensile member second ends each having a hook fastened thereto and adapted for receipt in a respective flap receivers.

* * * * *